United States Patent
Hamasaki et al.

(10) Patent No.: US 8,264,981 B2
(45) Date of Patent: Sep. 11, 2012

(54) INTER-MULTIPOINT VOICE CONVERSATION APPARATUS

(75) Inventors: Ryosuke Hamasaki, Kawasaki (JP); Yasuji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 12/767,925

(22) Filed: Apr. 27, 2010

(65) Prior Publication Data

US 2010/0208626 A1 Aug. 19, 2010

Related U.S. Application Data

(63) Continuation of application No. PCT/JP2007/001213, filed on Nov. 6, 2007.

(51) Int. Cl.
*G01R 31/08* (2006.01)
(52) U.S. Cl. ........................ 370/252; 370/328
(58) Field of Classification Search .......... 370/252, 370/328, 338
See application file for complete search history.

(56) References Cited

U.S. PATENT DOCUMENTS

| | | | |
|---|---|---|---|
| 4,317,206 A * | 2/1982 | Nossen | 375/224 |
| 2005/0286664 A1* | 12/2005 | Chen et al. | 375/349 |
| 2007/0025546 A1* | 2/2007 | Jabri et al. | 379/386 |
| 2007/0110258 A1 | 5/2007 | Kimijima | |
| 2007/0299661 A1* | 12/2007 | Raad et al. | 704/221 |
| 2009/0303897 A1* | 12/2009 | Kouretas et al. | 370/252 |

FOREIGN PATENT DOCUMENTS

| | | |
|---|---|---|
| EP | 1786240 A2 | 5/2007 |
| JP | 02059000 | 2/1990 |
| JP | 04237288 | 8/1992 |
| JP | 06311511 | 11/1994 |
| JP | 2001236084 | 8/2001 |
| JP | 2004208051 | 7/2004 |
| JP | 2005-229259 A * | 12/2004 |
| JP | 2005110103 | 4/2005 |
| JP | 2005229259 | 8/2005 |
| JP | 2007135046 | 5/2007 |
| WO | 2007009548 A1 | 1/2007 |

OTHER PUBLICATIONS

International Search Report dated Feb. 19, 2008 in corresponding International application No. PCT/JP2007/001213.
Notice of Rejection dated Jan. 17, 2012, issued in corresponding Japanese Patent Application No. 2009-539884.

* cited by examiner

*Primary Examiner* — Jung Park
(74) *Attorney, Agent, or Firm* — Murphy & King, P.C.

(57) ABSTRACT

A quality level analysis unit 504 specifies a coding method, communication line conditions, and a quality level, such as an S/N ratio and the like, of voices of an input channel, received by a corresponding receiving unit 501. A channel allocation/mixing unit 502 controls the allocation or mixing of voices of respective input channels to or into respective output channels 503 (output units 505) on the basis of the results of analysis by the quality level analysis unit 504. Consequently, loud speakers from which poor quality voices and good quality voices are output can be separated from one another, thus improving the total intelligibility of received voices.

14 Claims, 15 Drawing Sheets

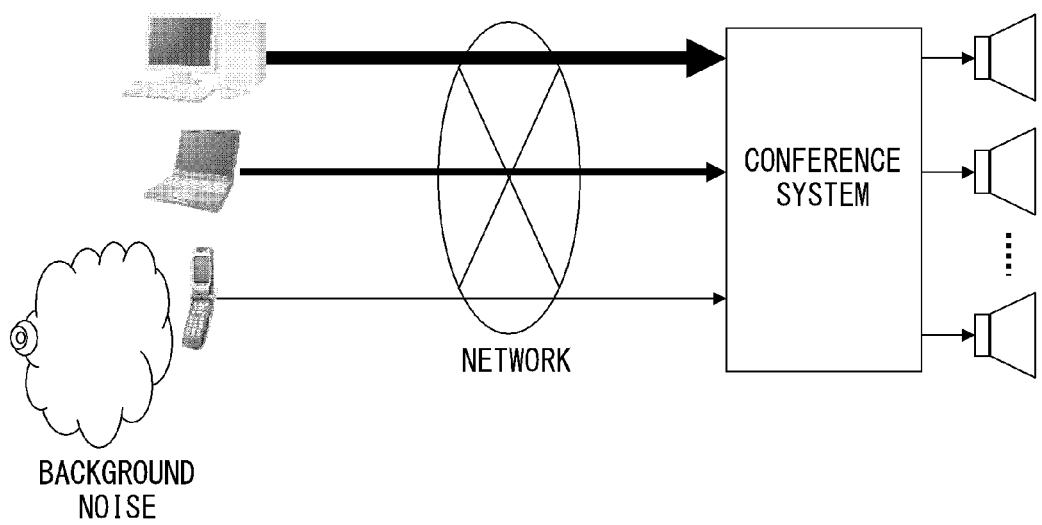
F I G. 1

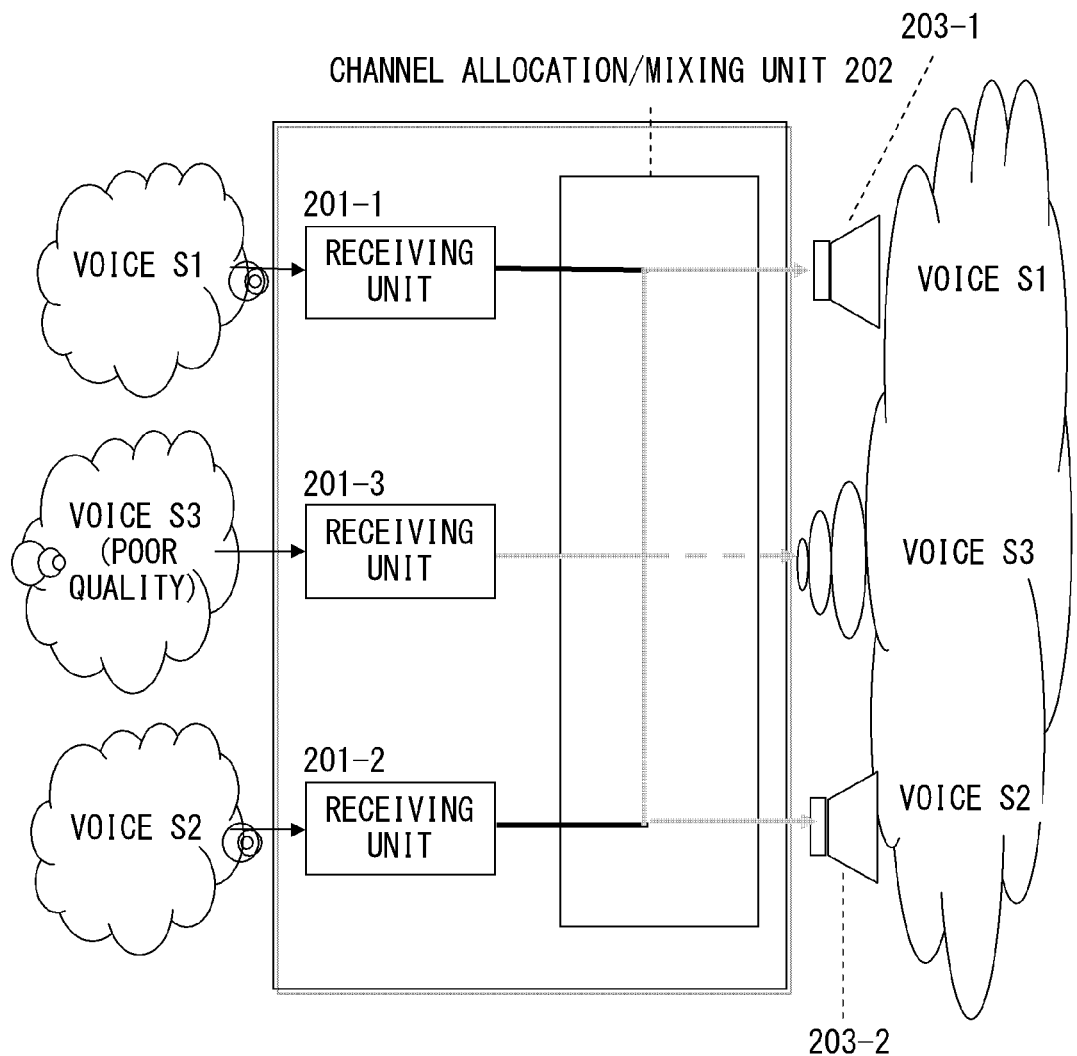
F I G. 2

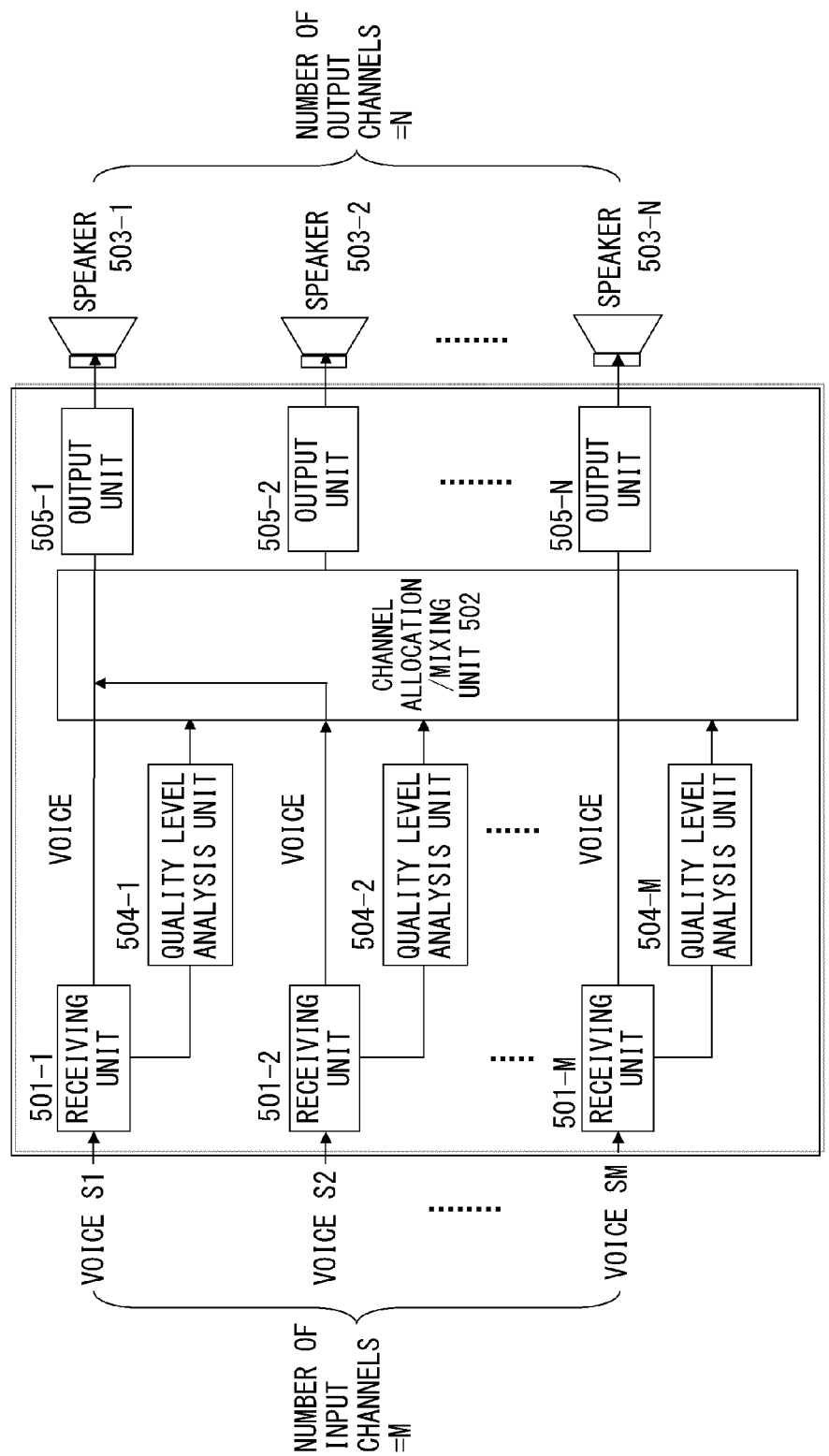
F I G. 6

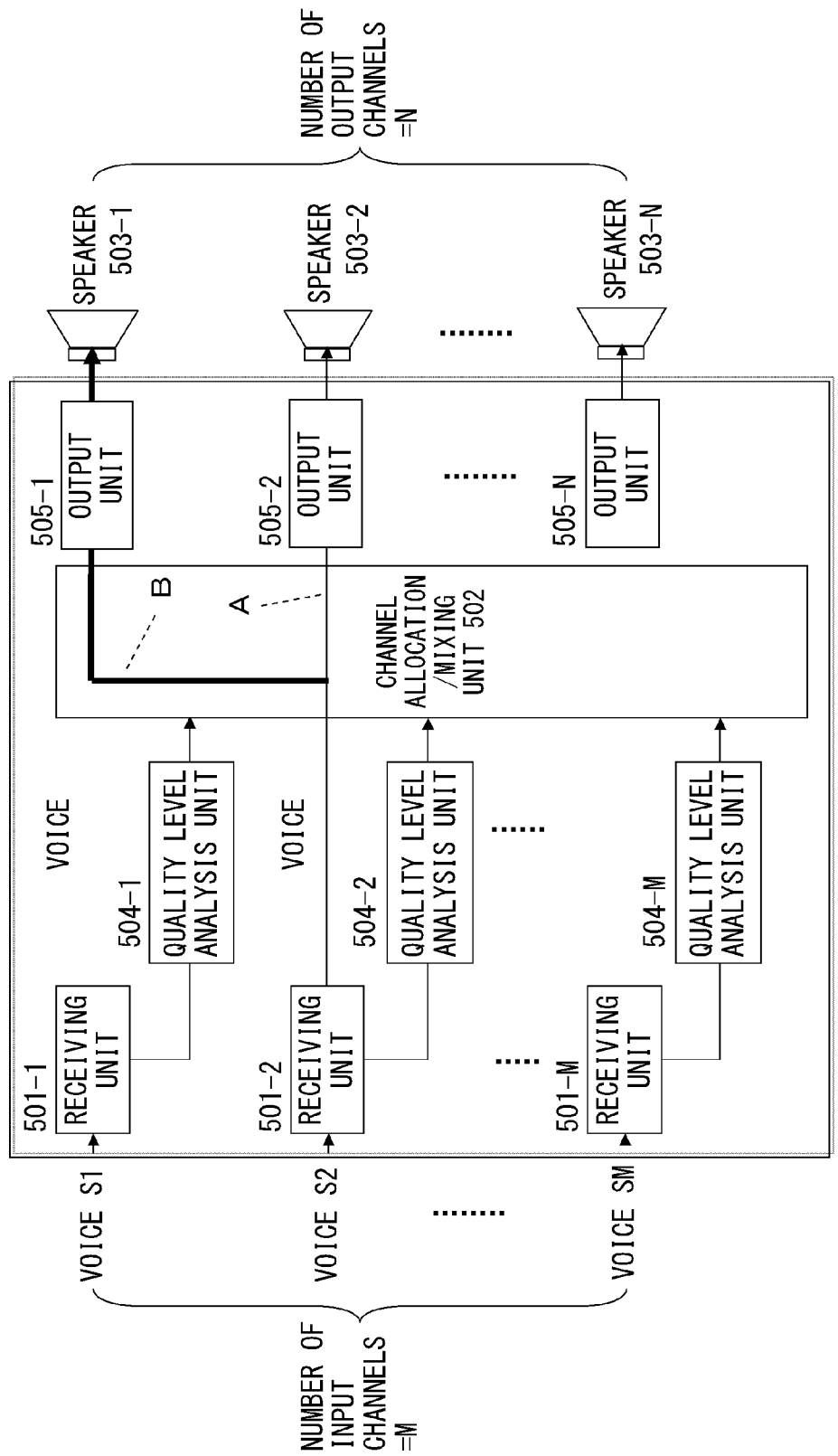
F I G. 7

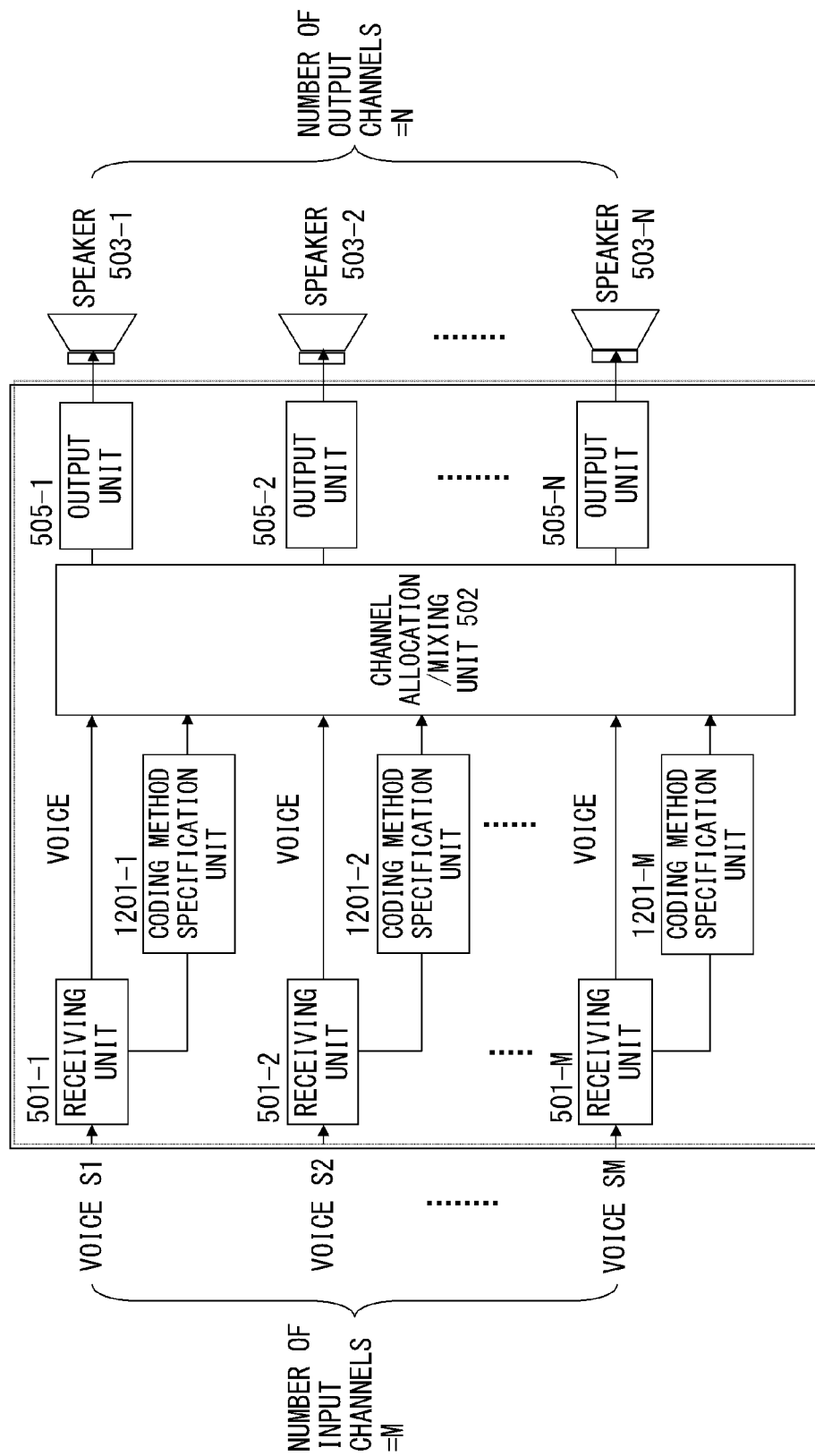
F I G. 1 2

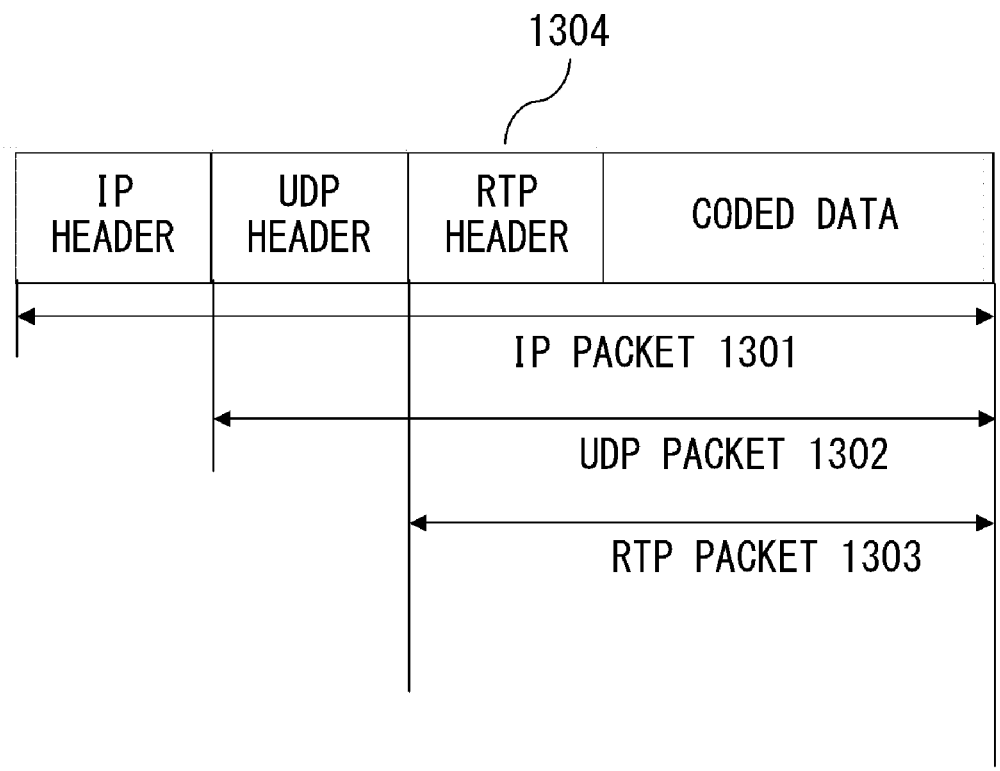
F I G. 1 3

|   | 7 | 6 | 5 | 4 | 3 | 2 | 1 | 0 |
|---|---|---|---|---|---|---|---|---|
| [0] | V | | P | X | CC | | | |
| [1] | M | | PT | | | | | |
| [2] | SEQUENCE NO. | | | | | | | |
| [3] | | | | | | | | |
| [4] | TIME STAMP | | | | | | | |
| [5] | | | | | | | | |
| [6] | | | | | | | | |
| [7] | | | | | | | | |
| [8] | | | | | | | | |
| [9] | | | | | | | | |
| [10] | | | | | | | | |
| [11] | | | | | | | | |
| [12] | | | | | | | | |
| [13] | | | | | | | | |
| [14] | | | | | | | | |
| [15] | | | | | | | | |

F I G. 1 4

INTER-MULTIPOINT VOICE CONVERSATION APPARATUS

CROSS REFERENCE TO RELATED APPLICATION

This application is a continuation of PCT application PCT/JP2007/001213 which was filed on Nov. 6, 2007.

FIELD

The embodiment discussed herein is related to an inter-multipoint voice conversation apparatus for connecting a plurality of points (multi-points) to conduct multipoint communications such as a conference and the like.

BACKGROUND

For backing up broad-band networks and small and high-performance video/audio input/output devices, multi-channel voice interface conference systems for connecting between multi-points, as illustrated in FIG. 1, have been popular.

In such a conference system, it is anticipated that the number of connecting points, such as mobile-phones and the like, in a mobile environment will increase in the future, and accordingly channels of varying quality are mixed and also background noise increases.

A case where in such an environment, inter-four-point communications are conducted using a receiver device including two stereo-speakers 203-1 and 203-2 for example, as illustrated in FIG. 2, will be considered. In this case, receiving units 201-1, 201-2 and 201-3 each receive respective voices S1, S2 and S3 from the other three points. Then, a channel allocation/mixing unit 202 allocates/mixes three received channels of voices S1, S2 and S3 and allocates them to/into the speakers 203-1 and 203-2.

In this case, when for example the channel allocation/mixing unit 202 allocates the voices S1, S2 and S3 without taking into account their voice quality, sometimes a poor-quality voice S3 is normally positioned and heard between the two loud speakers 203-1 and 203-2. As a result, the articulation of the other good-quality voices S1 and S2 decreases due to the poor-quality voice S3, which is a problem.

In other words, receiving quality is dispersed by the influence of the distortion of a CODEC mounted on a terminal and, depending on a mixing method, the deterioration factor of a received voice affects the quality of voices from the other points, which is a problem.

The following Patent document 1 discloses a technique for comparing the number of voice data transmitting devices with the number of output speakers on the receiving side for each point and mixing voices when the number of output speakers is smaller than the number of voice data transmitting devices. However, this publicly known example does not take the quality of a received signal into consideration.

The following Patent document 2 discloses a technique for exercising sound-image normal position control in which a frequency band for generating upward direction auditory perception is focused in a voice conference. More specifically, by this technique, a frequency band is divided for each audio signal every certain plural number of channels. For a band from which directional perception can be obtained (the second and third frequency bands), a sound image is normally positioned using a plurality of speakers, while for a band from which directional perception cannot be obtained (the first and fourth frequency bands), sound is reproduced by a single speaker. This publicly known example is a technique for targeting the maximization of a sound-image normal position effect and commonly applying a frequency band process to each input channel, which does not also take the quality of a received signal into consideration.

The following Patent document 3 discloses a technique for generating a correspondence table between the horizontal coordinate position and a sound-image normal position area at the center of an image window in advance in a television conference system and distributing voices corresponding to a target image to each speaker according to a speaker output ratio peculiar to each sound-image normal position area, on the basis of this correspondence table. This publicly known example is a technique for determining the specification of a sound-image normal position using a table conversion based on the display position of simultaneously transmitted image data (horizontal coordinates) and which does not also take the quality of a received signal into consideration.

Patent document 1: Japanese Laid-open Patent Publication No. 2004-208051
Patent document 2: Japanese Laid-open Patent Publication No. 02-059000
Patent document 3: Japanese Laid-open Patent Publication No. 06-311511

SUMMARY

The first aspect of the present invention has the following configuration.

A quality level analysis unit specifies its quality level by analyzing the coding method, a communication line condition (the characteristics of delay in a voice packet, the characteristics of jitter in a voice, the characteristics of loss in a voice packet, the characteristics of echo in a voice, etc.), a level of noise mixed in, an S/N ratio, and the like of a voice of each input channel received by a voice receiving unit, or by analyzing a combination of two or more of these.

A channel allocation/mixing unit controls the allocation/mixing of voices of respective input channels to/into output channels (output units, speakers 503) on the basis of the results of analysis by the quality level analysis units. This channel allocation/mixing unit mixes voices of input channels analyzed to have the same quality level by the quality level analysis units into output channels. The channel allocation/mixing unit also stores threshold information in which classified quality level layers are allocated to each output channel in advance and allocates or mixes voices of respective input channels received by input units to or into output channels corresponding to quality level layers to which the quality levels of the voices belong, with reference to the threshold information.

According to the above configuration, speakers from which a poor quality voice and a good quality voice are output can be separated from one another, thus improving the intelligibility of all the received voices.

The second aspect of the present invention further includes a quality level comparison unit for comparing with each other the quality levels of respective input channels analyzed by the quality level analysis units as time lapses and notifying the channel allocation/mixing unit of the modification of its allocation/mixing of voices of respective input channels to/with those of output channels when their relationship changes. For example, when the number of input channels of voices received by the receiving unit during voice communications increases, this quality level comparison unit detects a quality level closest to that of the voice of a newly increased input channel analyzed by the quality level analysis unit, from among the quality levels of voices of respective input channels analyzed by the quality level analysis unit. Then, the channel allocation/mixing unit mixes the voice of the newly increased input channel into an output channel to which the quality level detected by the quality level comparison unit is allocated. For example, when the number of input channels of voices received by the receiving unit during voice communications decreases, the quality level comparison unit detects a quality level group mixed by the channel allocation/mixing unit according to a predetermine rule and separates out a portion of the quality level group. Then, the channel allocation/mixing unit re-allocates the voice of an input channel corresponding to the portion of the quality level group separated out by the quality level comparison unit to that of another output channel that is different from the output channel having the voice corresponding to the quality level detected by the quality level comparison unit.

According to the above configuration, the ill effects of the deterioration factor of one received voice on the quality of voices received from other points, depending on the method used to mix the voices, can be dynamically minimized as time elapses. More specifically, one channel of voices can be added without a decrease in the total articulation or the total articulation can be improved by allocating a group of voices initially mixed following the decrease in the number of channels to different speakers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the concept of an inter-multi point conference system.

FIG. 2 explains the problems of the prior art.

FIG. 6 explains the operation of the first preferred embodiment of the present invention.

FIG. 7 explains the operation of the second preferred embodiment of the present invention.

FIG. 12 is a configuration of the sixth preferred embodiment of the present invention.

FIG. 13 illustrates the structure of a general RTP packet.

FIG. 14 illustrates the structure of an RTP header.

DESCRIPTION OF EMBODIMENTS

Preferred embodiments of the present invention will be explained in detail below with reference to accompanying drawings.

Principle of the Invention

Figure 3:
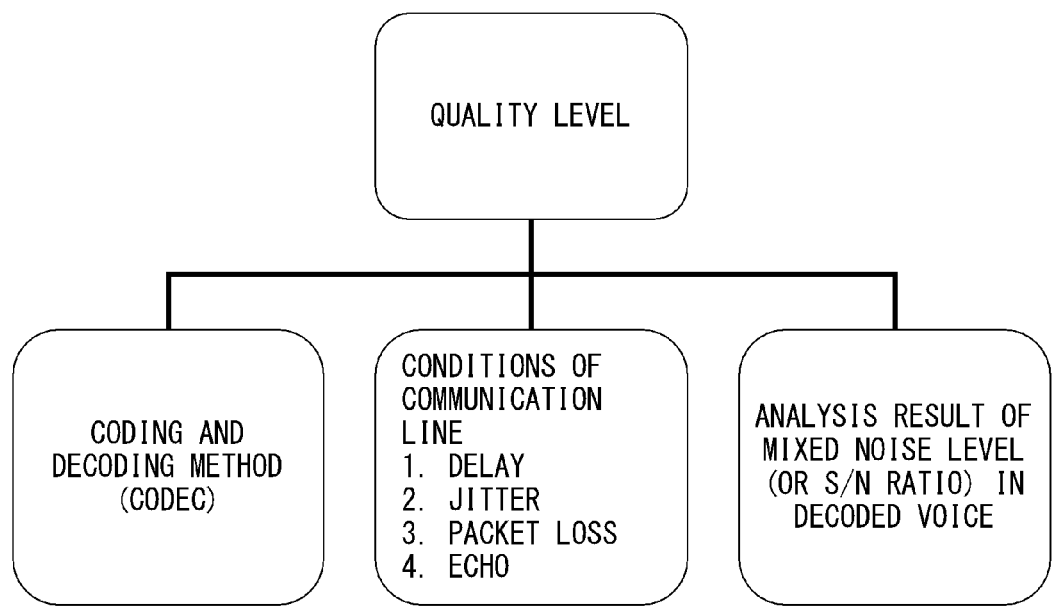
FIG. 3 illustrates representative factors for determining a quality level.

The present invention will be explained by analyzing/specifying the following major factors for determining the quality of a received voice (see FIG. 3):

Coding (compression) method

Condition of a communication line (delay, jitter, packet loss, echoes, etc.)

Analysis result of a mixed noise level (or S/N ratio) in a decoded voice; the quality levels of respective channel voices can be determined and received voices at the same quality level can be mixed as an input signal to one speaker.

Furthermore, by outputting a pour quality voice from a speaker at either the left or right end, the present invention can minimize the deterioration of a good quality voice by a pour quality voice and improve the intelligibility of the total received voices.

Figure 4:
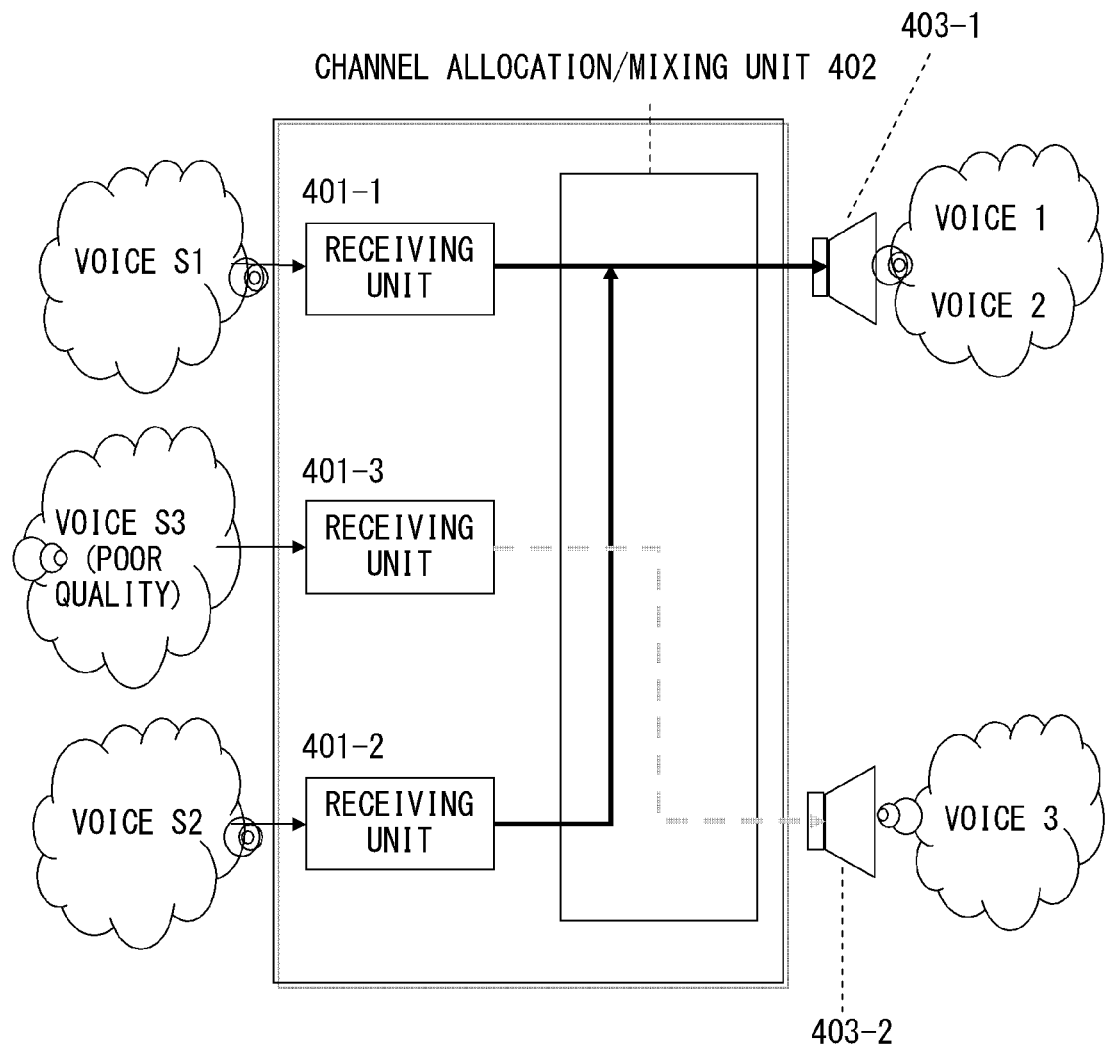
FIG. 4 is a configuration of the solution of the problems of the prior art.

For example, a case where inter-four-point communications are conducted using a receiving device including two speakers 403-1 and 403-2, as illustrated in the example of FIG. 4, will be considered. In this case, receiving units 401-1, 401-2 and 401-3 receive voices S1, S2 and S3, respectively, from the other three points. Then, a channel allocation/mixing unit 402 mixes received voices S1, S2 and S3 from the three channels and allocates them to the speakers 403-1 and 403-2.

In this case, when, for example, the quality of voice S3 is poor, the channel allocation/mixing unit 402 prevents the quality of voices S1 and S2 from deteriorating by outputting voices S1 and S2 from the speaker 403-1 and separating voice S3 having poor quality from voices S1 and S2 and outputting it from the speaker 403-2.

First Embodiment

Figure 5:
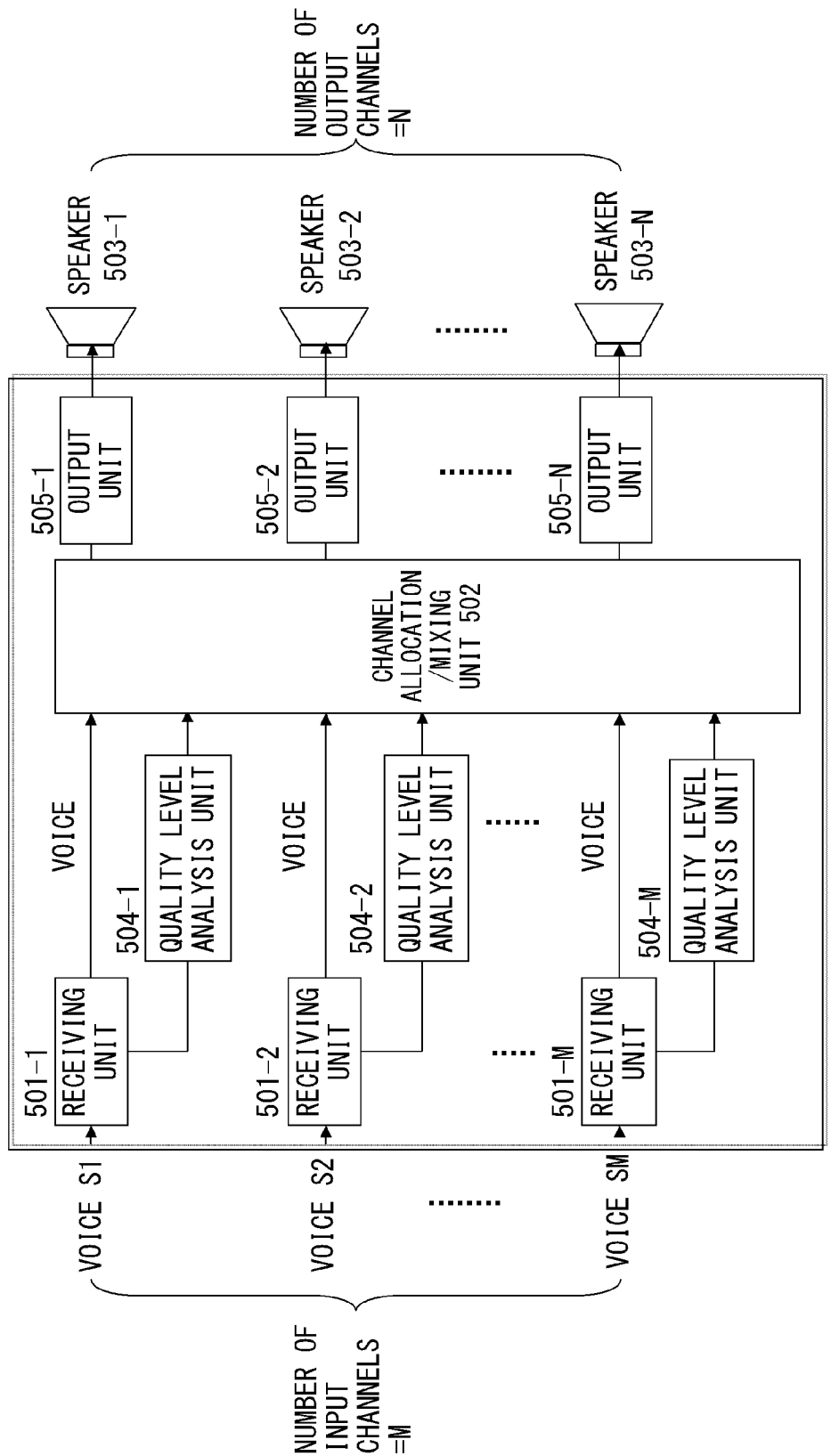
FIG. 5 is a configuration of the first preferred embodiment of the present invention.

FIG. 5 is a configuration of the first preferred embodiment of the present invention.

The first preferred embodiment includes M channels of quality level analysis units 504-1, 504-2, . . . , 504-M and N channels of output units 505-1, 505-2, . . . , 505-N, for driving the respective speakers in addition to M channels of receiving units 501-1, 501-2, . . . , 501-M, a channel allocation/mixing unit 502, and N channels of speakers 503-1, 503-2, . . . , 503-N.

In this case, the quality level analysis units 504-$i$ of channels i ($1 \leq i \leq M$) analyze the quality levels of voices Si received by the receiving units 504-$i$ of channels i.

The channel allocation/mixing unit 502 determines the allocation and mixing of output units 505-$j$ ($1 \leq j \leq N$) for outputting the voices Si having respective quality levels, on the basis of the respective quality levels of the voices Si analyzed by respective quality level analysis units 504-$i$ ($1 \leq i \leq M$).

In the first preferred embodiment of the present invention, the channel allocation/mixing unit 502 mixes voices at the same quality level from among a plurality of voices Si ($1 \leq i \leq M$) on the basis of the respective quality levels of respective voices Si analyzed by respective quality level analysis units 504-$i$ ($1 \leq i \leq M$) and inputs them to one output unit 505-$j$ ($1 \leq j \leq N$).

For example, FIG. 6 is an operation example in the case where the quality levels of voices S1 and S2 are equally high and the quality level of voice SM is low. In this operation example, the channel allocation/mixing unit 502 mixes voices S1 and S2 having high quality levels by determining the analysis results of the quality level analysis units 504-1 and 504-2 and inputs them to the output unit 505-1. The channel allocation/mixing unit 502 also inputs the voice SM having a low quality level to the output unit 505-N by determining the analysis result of the quality level analysis unit 504-M.

As a result, by using different speakers 503-1 and 503-N for the output of voices S1 and S2 having high quality levels and voice SM having a low quality level, respectively, and locating them physically far away from each other, the influences of voices S1 and S2 on the quality deterioration of voice SM can be suppressed to a minimum level.

Second Embodiment

FIG. 7 explains the operation of the second preferred embodiment of the present invention. Its basic configuration is the same as that of the first preferred embodiment of the present invention, illustrated in FIG. 5.

The channel allocation/mixing unit 502 inputs a voice having a desired quality level from among a plurality of voices Si ($1 \leq i \leq M$) to a desired output unit 505-$j$ ($1 \leq j \leq N$) on the basis of the quality levels of respective voices Si ($1 \leq i \leq M$) analyzed by respective quality level analysis units 504-$i$ ($1 \leq i \leq M$).

In the example, illustrated in FIG. 7, although initially a receiver hears voice S2 through the output unit 505-2 and the speaker 503-2 (line A in FIG. 7), the receiver can modify them to the output unit 505-1 and the speaker 503-1 for the purpose of hearing a positional relationship, the addition of a received voice, or the like (line B in FIG. 7).

Since the quality level analysis units 504-$i$ ($1 \leq i \leq M$) analyze the quality levels of the voices Si of respective channels i, for example, the channel allocation/mixing unit 502 stores threshold data for respective classified quality level layers in advance and determines output units 505-$j$ ($1 \leq j \leq N$) to which input voices are allocated or with the voices of which the input voices are mixed with reference to this threshold data.

According to this function, speakers can be arranged in such a way as to be convenient for the receiver. For example, the speakers 503 can be horizontally arranged in such a way that their quality levels may sequentially deteriorate.

In the channel allocation/mixing unit 502, it is not necessary for a voice Si to always be mixed and outputted.

Third Embodiment

Figure 8:
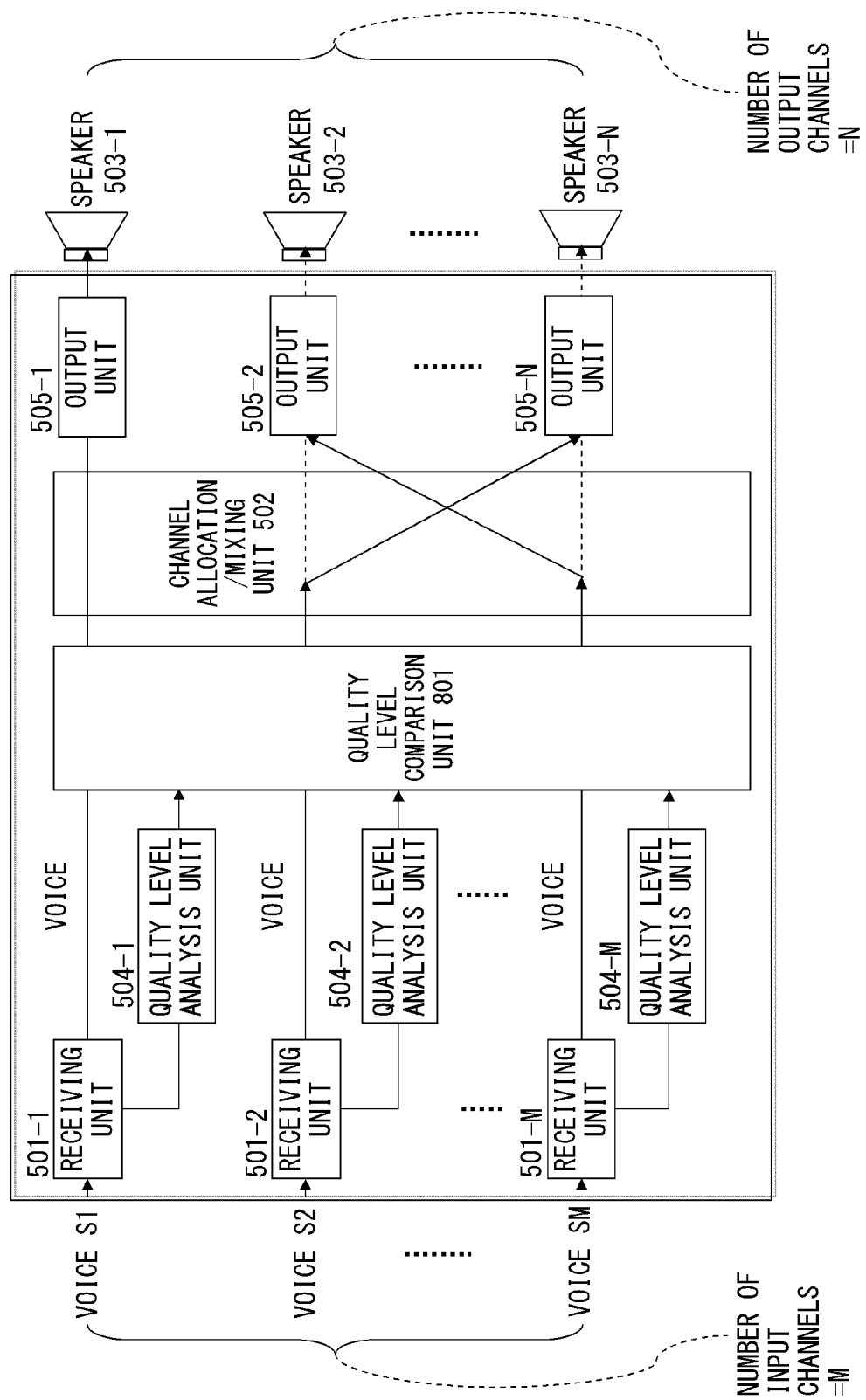
FIG. 8 illustrates the configuration and operation of the third preferred embodiment of the present invention.

FIG. 8 illustrates the configuration and operation of the third preferred embodiment of the present invention.

This preferred embodiment includes a quality level comparison unit 801 for comparing the quality levels of respective voices Si analyzed by respective quality level analysis units 504-$i$ (($1 \leq i \leq M$) in addition to the configuration of the first or second preferred embodiment of the present invention illustrated in FIG. 5.

In this example, for the purpose of simplifying the explanation, it is assumed that the number M of input channels=the number N of output channels.
State 1: Initially, for example, it is assumed that the quality level of a voice S2 is normal and that the voice S2 is output from the output unit 505-2 and the speaker 503-2 and that the quality level of a voice SM is poorest and that the voice SM is output from the output unit 505-N and the speaker 503-N.
State 2: In the midst of voice communications, when the quality level of the voice S2 is normal and the quality level of the voice SM becomes better than that of the voice 2, the quality level comparison unit 801 detects this fact and the channel allocation/mixing unit 502 switches between the respective allocations of the voices S2 and SM to the output units 505 and the speakers 503.

According to the above process, ill effects on the respective quality of voices received from other points due to the deterioration factor of one received voice can be dynamically minimized depending on the mixing method.

Fourth Embodiment

Figure 9:
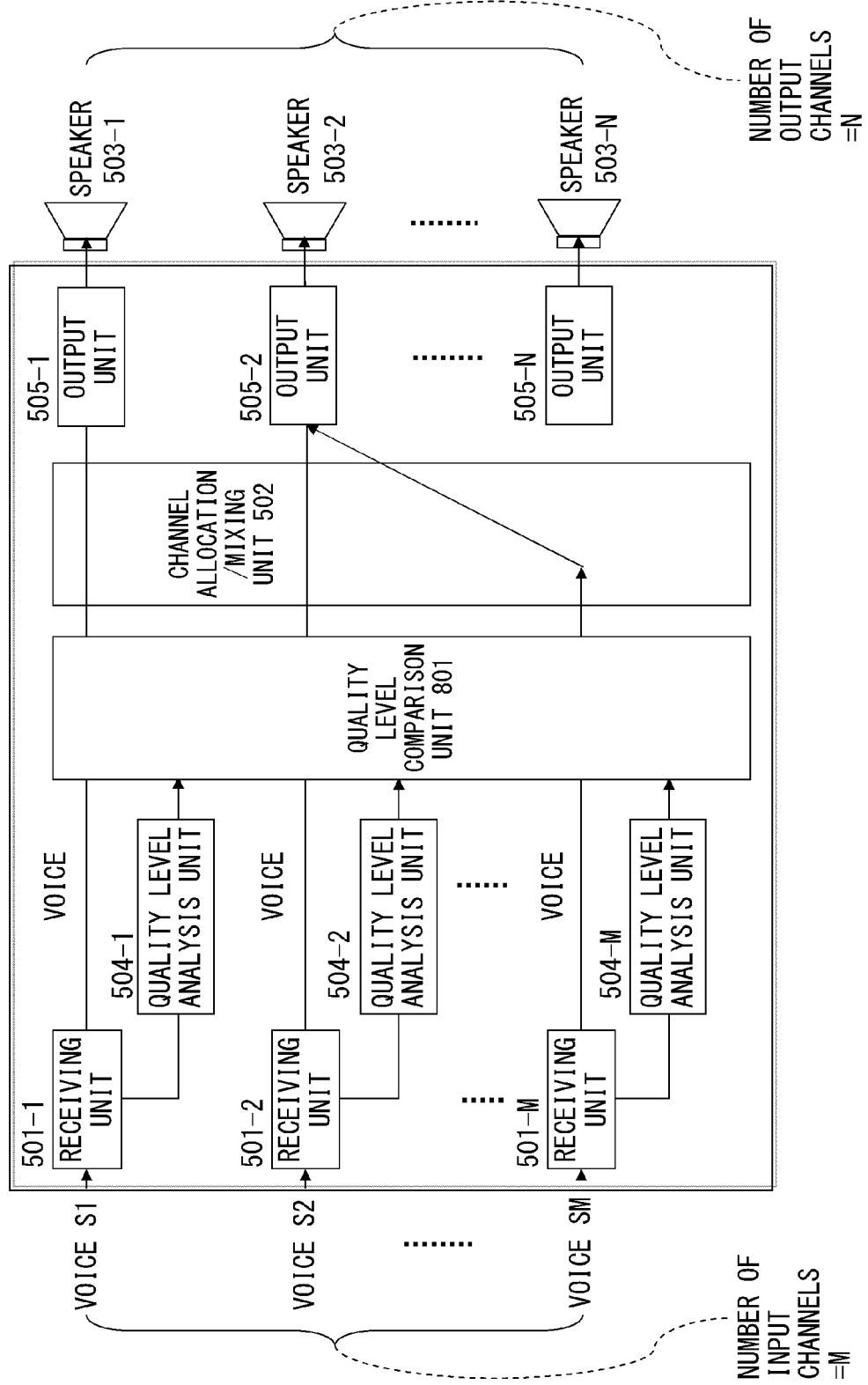
FIG. 9 explains the operation of the fourth preferred embodiment of the present invention.

FIG. 9 explains the operation of the fourth preferred embodiment of the present invention. Its basic configuration is the same as that of the third preferred embodiment of the present invention illustrated in FIG. 8.
State 1: Initially a voice SM is not connected to the inter-multipoint voice conversation system illustrated in FIG. 9.
State 2: In the midst of the conference, the voice SM gets connected to the inter-multipoint voice conversation system illustrated in FIG. 9.
State 3: When the number M of input channels<the number N of output channels, since the number N of the output units 505 and the speakers 503 is large, a voice SM can also be output from extra output units 505 and speakers 503.
State 4: However, when the number M of input channels>the number N of output channels, it is necessary to mix the voice SM into an input signal from one of the output units 505-1 through 505-N in output operations. In this case, the quality level comparison unit 801 detects a voice Si closest to the quality level of the voice SM analyzed by the quality level analysis unit 504-M from among the quality levels of respective voices Si analyzed by the quality level analysis units 504-$i$ ($1 \leq i \leq M-1$) and notifies the channel allocation/mixing unit 502 of the detection results. The channel allocation/mixing unit 502 mixes the voice SM into an input signal to an output unit to which the detected quality level is allocated; for example, to the output unit 505-2.

According to the above process, one channel of voices can be added without a deterioration in the total articulation.

Fifth Embodiment

Figure 10:
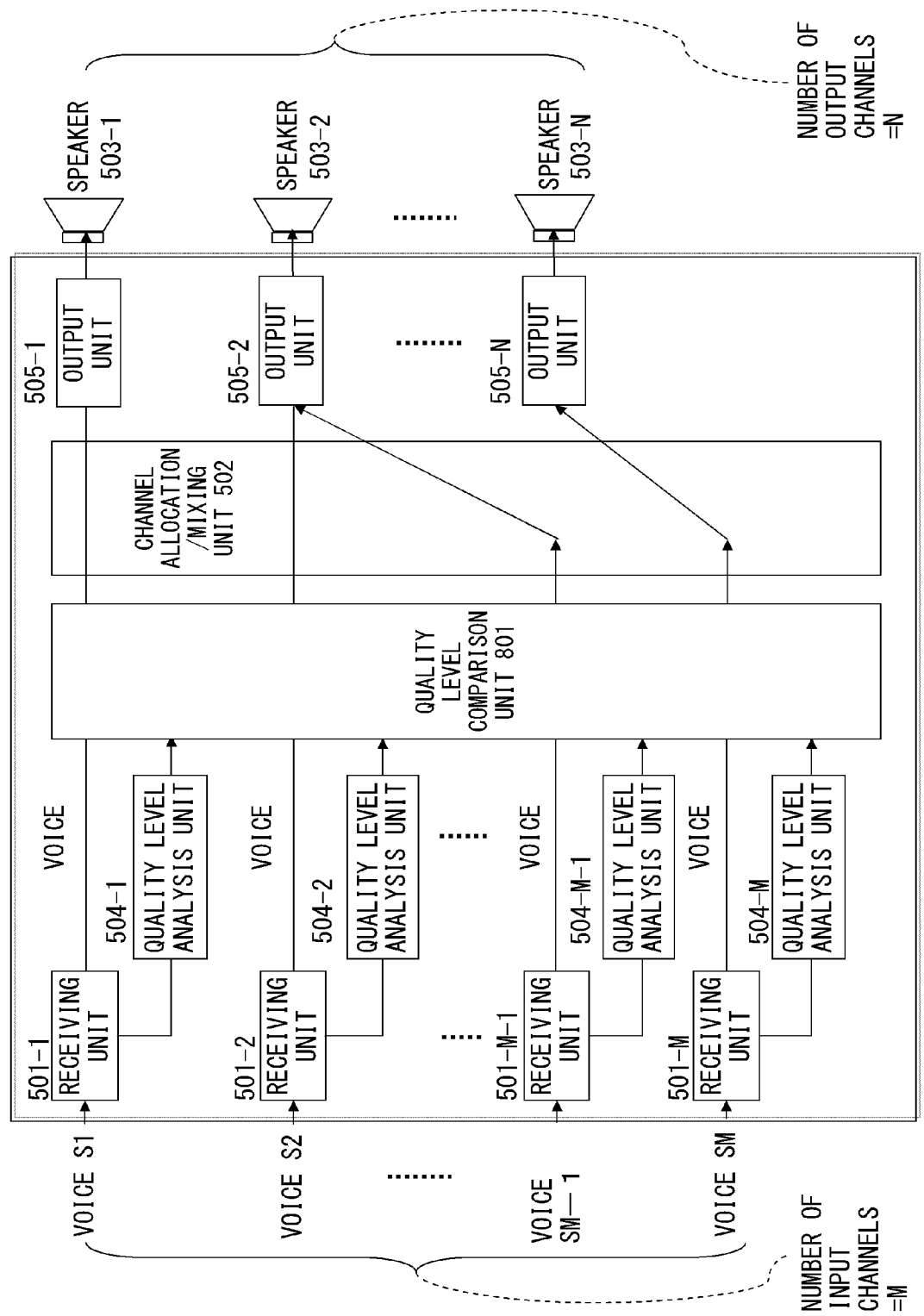
FIG. 10 explains the operation of the fifth preferred embodiment of the present invention (No. 1).
Figure 11:
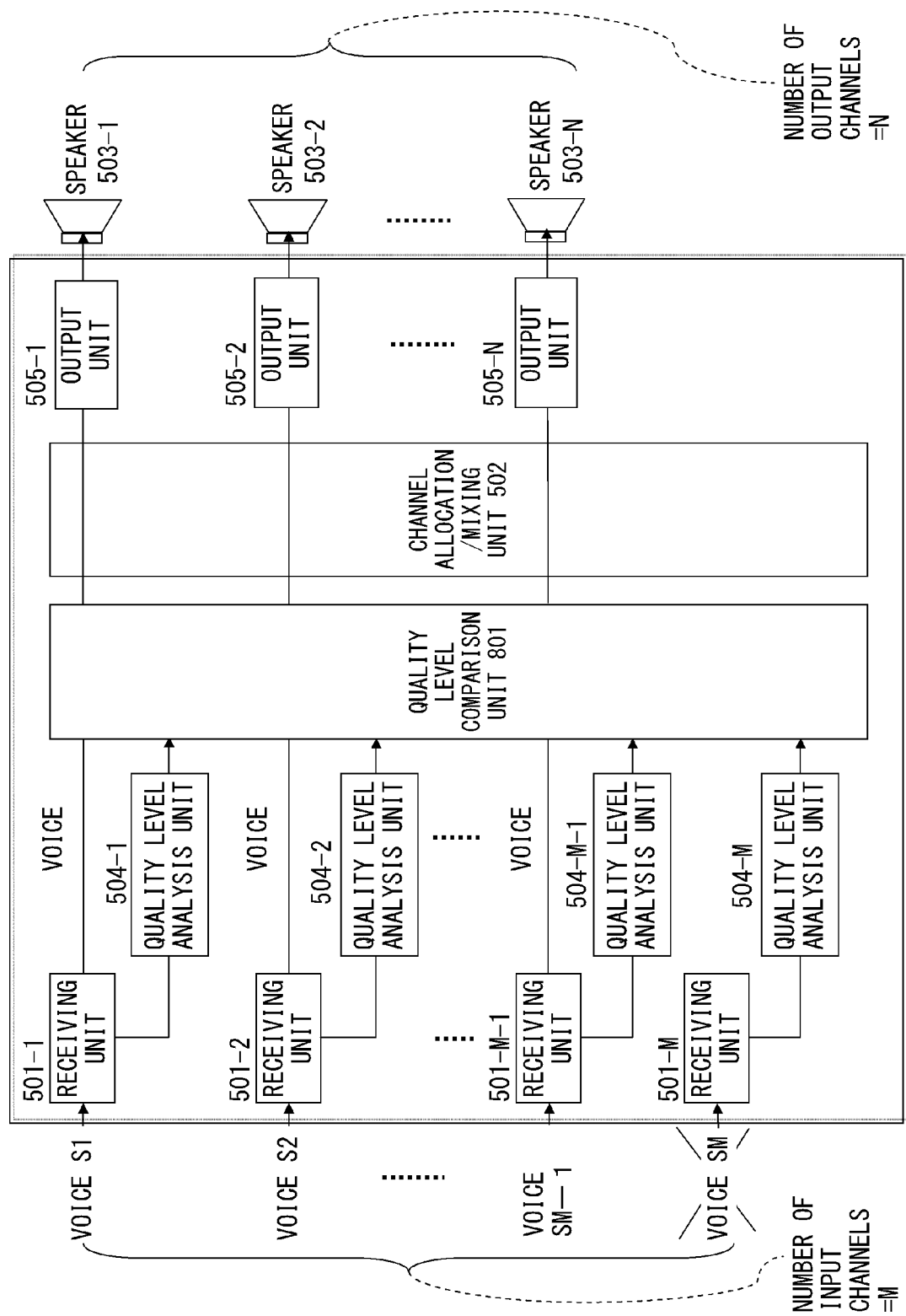
FIG. 11 explains the operation of the fifth preferred embodiment of the present invention (No. 2).

FIGS. 10 and 11 explain the operation of the fifth preferred embodiment of the present invention. Its basic configuration is the same as that of the third preferred embodiment of the present invention illustrated in FIG. 8.
State 1: In the midst of the conference, the voice SM gets disconnected from the inter-multipoint voice conversation system illustrated in FIG. 10.
State 2: When the number M of input channels<the number N of output channels at the starting time of the inter-multipoint voice conversation, since the number of sets of the output units 505 and the speakers 503 is large, some sets of the output units 505 and the speakers 503 become superfluous due to the disconnection of the voice SM. In this case, there is no change in the configuration of voice output.
State 3: When the number M of input channels>the number N of output channels at the starting time of the inter-multipoint voice conversation, with the disconnection of the voice SM, a voice group mixed in some set of the output unit 505 and the speaker 503 can be separated and allocated to a plurality of sets of the output units 505 and the speakers 503.

Thus, there is a possibility that articulation of the total voices can be improved. In this case, the quality level comparison unit 801 detects quality levels that are determined to be the closest to each other from among the respective quality levels of respective voices Si analyzed by respective quality level analysis units 504-$i$ ($1 \leq i \leq M-1$), and they are mixed, and the quality level comparison unit 801 notifies the channel allocation/mixing unit 502 of the detection results. The channel allocation/mixing unit 502 separates a group of voices that is currently mixed and is reported and re-allocates one channel of them to a set of the output unit 505 and the speaker 503 that is emptied by the disconnection of the voice SM. For example, when initially voices S2 and SM-1 are mixed and are allocated to the output unit 505-2, as illustrated in FIG. 10, and when the voice SM allocated to the output unit 505-N is disconnected, the voices S2 and SM-1 are separated and as illustrated in FIG. 11, the voices S2 and SM-1 are re-allocated to the output units 505-2 and 505-N, respectively.

According to the above process, the entire articulation can be improved by allocating a group of voices initially mixed to different sets of the output units 505 and the speakers 503.

Sixth Embodiment

FIG. 12 is a configuration of the sixth preferred embodiment of the present invention.

The configuration of this preferred embodiment illustrates a detailed realization method of the quality level analysis unit 504 in the basic configuration of the present invention illustrated in FIG. 5.

As its one example, the quality level analysis unit 504 can be realized as a coding method specification unit 1201. There is a plurality of coding methods and the number of quantization bits, a frequency bandwidth, and a compression method differ depending on a coding method. Therefore, if a coding method differs even when original voices are the same, voices having various quality levels are generated.

For example, as a technique for compressing voices by various coding methods to convert them to packets and transmitting them on the Internet in real time, a VoIP (voice-over Internet protocol) is standardized. In the VoIP, an RTP (real-time transport protocol) is used to transmit encoded data. FIG. 13 illustrates the structure of a general RTP packet. On the Internet an RTP packet 1303 is stored in a UDP (user datagram protocol) packet 1301 which is transmitted using an IP (Internet protocol) packet 1301 and is transmitted. Since the UDP packet 1302 is transmitted without re-transmission control, it is suited to transmit real-time information. Information called PT (payload type) 1401 having a data length of six bits is stored in the RTP packet 1303, as illustrated in FIG. 14. This PT 1401 indicates by what coding method the RTP packet 1303 currently transmitting voice data is encoded. For a standardized coding method adopted in the VoIP, ITU-T G.711 (PCM: pulse-code modulation method), ITU-T G.726 (ADPCM: adaptive differential pulse-code modulation method), ITU-T G 723.1 (ACELP: algebraic CELP method and MP-MLQ: dual method of multipath through-maximum likelihood method), ITU-T G 729 (CS-ACELP: conjugate structure algebraic CELP method) and the like are used. These respective methods have different bit rates and quality and one of the methods is selected in accordance with the characteristic of a network on which voices are encoded. Thus, in a structure example of the coding method specification unit 1201 illustrated in FIG. 12, a coding method can be determined by identifying the values of the PT 1401 in respective RTP packets 1303 received by the receiving unit 501-1 and the quality levels of received voices can be determined.

Seventh Embodiment

In the seventh preferred embodiment of the present invention, the quality level analysis unit 504 illustrated in FIG. 5 is realized as a communication line condition analysis unit, which is not illustrated, and the quality level is determined by this. More specifically, this communication line condition analysis unit can also be realized as a delay analysis unit, a fluctuation analysis unit, a packet loss analysis unit, or an echo analysis unit.

The delay analysis unit analyzes the delay of received voice data. Delay is a phenomenon wherein the transmission of packets is delayed due to processes waiting in a transmitter, a repeater and a receiver, the congestion of a network, and the like. Long delays lead to much deterioration in quality level. The delay analysis unit can be realized, for example, by determining a time stamp stored in the header section of a voice packet received by the receiving unit 501 illustrated in FIG. 5, by transmitting ping packets at certain intervals and measuring its round-trip time, or the like.

The jitter analysis unit analyzes fluctuation of received voice data. Jitter is a phenomenon wherein the transmission time of packets is not stable because of a network congestion. Jitter leads to the distortion of voices and the deterioration of a quality level. The jitter analysis unit can be realized, for example, by checking the dispersion (standard deviation, etc.) of an interval of a voice packet received by the receiving unit 501 illustrated in FIG. 5.

The packet loss analysis unit analyzes the packet loss of received voice data. Packet loss is a phenomenon wherein a voice packet is discarded due to the congestion of a network and the like. Packet loss leads to the interruption of voices and the deterioration of a quality level. The packet loss analysis unit can be realized, for example, by checking the continuity of sequence numbers stored in the header section of a voice packet received by the receiving unit 501 illustrated in FIG. 5.

The Echo analysis unit analyzes the echo of received voice data. Echo is a phenomenon wherein an audio signal is reflected by a voice network and is heard. When echoes occur, the voices of the voice network are delayed and heard and their quality levels deteriorate. The echo analysis unit can be realized, for example, by detecting the operational state of an echo canceller.

Eighth Embodiment

In the eighth preferred embodiment of the present invention, the quality level analysis unit 504 illustrated in FIG. 5 is realized as a mixed noise level analysis unit, which is not illustrated, and by this, a quality level is determined. When noise is mixed into a received voice, its quality level naturally deteriorates. The mixed noise level analysis unit can be realized, for example, by detecting the voiceless section of a voice received by the receiving unit 501 illustrated in FIG. 5 and measuring the signal level of the section.

Ninth Embodiment

In the ninth preferred embodiment of the present invention, the quality level analysis unit 504 illustrated in FIG. 5 is realized as a signal/mixed noise level ratio (S/N ratio) analysis unit, which is not illustrated, and by this, a quality level is determined. As in the eighth preferred embodiment of the present invention, as the ratio of an audio signal level to a mixed noise level in a received voice increases, a quality level deteriorates. The signal/mixed noise level ratio (S/N ratio) analysis unit can be realized, for example, by measuring the signal level ratio between a voiceless section and a voice section of a voice received by the receiving unit 501 illustrated in FIG. 5.

Tenth Embodiment

Figure 15:
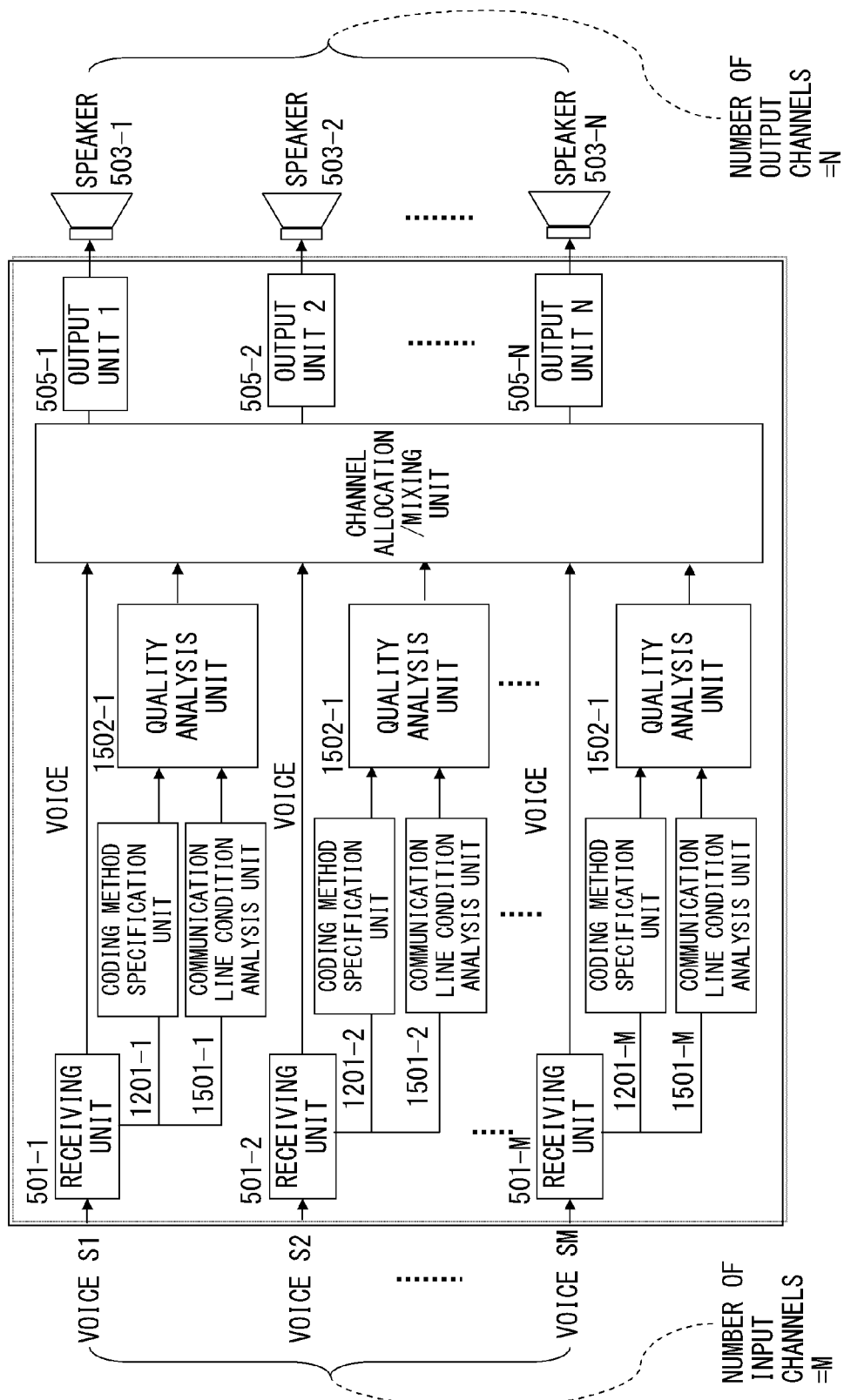
FIG. 15 is a configuration of the tenth preferred embodiment of the present invention.

FIG. 15 is a configuration of the tenth preferred embodiment of the present invention.

Like the configuration of the sixth preferred embodiment, the configuration of this preferred embodiment illustrates a detailed realization method of the quality level analysis unit 504 in the basic configuration of the present invention illustrated in FIG. 5.

Although in the above-described preferred embodiments, the quality level analysis unit 504 is realized as a means for focusing on one factor having a possibility of affecting a quality level and analyzing it, a quality level is normally determined by a plurality of factors.

Then, in the configuration illustrated in FIG. 15, as one example, the quality level analysis unit 504 illustrated in FIG. 5 is realized by two analysis units of a coding method specification unit 1201, a communication line condition analysis unit 1501 and a quality level analysis unit 1502 for analyzing a quality level on the basis of the respective output of those analysis units.

Additionally, the quality level analysis unit 504 illustrated in FIG. 5 can be realized by an arbitrary combination of the representative factors for determining a quality level in the sixth preferred embodiment. Furthermore, the number of factors to be combined is not limited to two and it can be more than two. Although in FIG. 15, respective blocks for analyzing quality factors such as 1201, 1501 and the like are connected in parallel in such away as to determines analysis results of respective blocks in parallel, they can also be connected in cascade in such a way that the latter stage quality factor is analyzed on the basis of the result of the former quality factor analysis.

Supplement to First through Tenth Embodiments

In the above-explained the first through tenth preferred embodiments of the present invention, when the channel allocation/mixing unit 502 switches over the allocation or mixing states of voices Si ($1 \leq i \leq M$) to the output units 505-$j$ ($1 \leq j \leq N$), subsequent switching can also be prevented from occurring for a certain time after switching occurs once, thus suppressing auditory discomfort due to frequent switching.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. An inter-multipoint voice conversation apparatus for conducting voice communications among a plurality of points, comprising:
    a receiving unit configured to receive voices of one or more input channels;
    a quality level analysis unit configured to specify quality levels of voices of respective input channels received by the receiving unit;
    a channel allocation/mixing unit configured to allocate each of the voices of one or more input channels which are received by the receiving unit and which are analyzed to have the same quality level by the quality level analysis unit to a same output channel of one or more output channels, and respectively mix the voices of one or more input channels into voices of the allocated output channels; and
    an output unit configured to output voices of the respective output channels.

2. The inter-multipoint voice conversation apparatus according to claim 1, wherein
    the channel allocation/mixing unit stores threshold information in which classified quality level layers are allocated to the respective output channels in advance and allocates or mixes voices of respective input channels received by the receiving unit to output channels corresponding to quality level layers.

3. The inter-multipoint voice conversation apparatus according to claim 1, further comprising
    a quality level comparison unit configured to compare quality levels of the respective input channels analyzed by the quality level analysis unit, and when their relationship changes, notify the channel allocation/mixing unit of a modification in states of allocation or mixing voices of the respective input channels to or into voices of the respective output channels.

4. An inter-multipoint voice conversation apparatus for conducting voice communications among a plurality of points, comprising:
    a receiving unit configured to receive voices of one or more input channels;
    a quality level analysis unit configured to specify quality levels of voices of respective input channels received by the receiving unit;
    a channel allocation/mixing unit configured to allocate or mixing voices of respective input channels received by the receiving unit to or into voices of one or more output channels;
    an output unit configured to output voices of the respective output channels; and
    a quality level comparison unit configured to compare quality levels of the respective input channels analyzed by the quality level analysis unit, and when their relationship changes, notify the channel allocation/mixing unit of a modification in states of allocation or mixing voices of the respective input channels to or into voices of the respective output channels, wherein
    when the number of input channels of voices received by the receiving unit during voice conversation increases, the quality level comparison unit detects a voice closest to a quality level of voices of a newly increased input channel analyzed by the quality level analysis unit from among quality levels of voices of respective input channels analyzed by the quality level analysis unit and
    the channel allocation/mixing unit mixes voices of the newly increased input channel into an output channel to which a quality level detected by the quality level comparison unit.

5. An inter-multipoint voice conversation apparatus for conducting voice communications among a plurality of points, comprising:

a receiving unit configured to receive voices of one or more input channels;

a quality level analysis unit configured to specify quality levels of voices of respective input channels received by the receiving unit;

a channel allocation/mixing unit configured to allocate or mixing voices of respective input channels received by the receiving unit to or into voices of one or more output channels;

an output unit configured to output voices of the respective output channels; and a quality level comparison unit configured to compare quality levels of the respective input channels analyzed by the quality level analysis unit, and when their relationship changes, notify the channel allocation/mixing unit of a modification in states of allocation or mixing voices of the respective input channels to or into voices of the respective output channels, wherein when the number of input channels of voices received by the receiving unit during voice conversation decreases, the quality level comparison unit detects a quality level mixed by a channel allocation/mixing unit according to a predetermined rule, separates voices of a portion of input channels having this quality level, and reallocates output channels with the allocation/mixing unit.

6. The inter-multipoint voice conversation apparatus according to claim 1, wherein the quality level analysis unit includes a coding method specification unit configured to specify a coding method of voices of the respective input channels.

7. The inter-multipoint voice conversation apparatus according to claim 1, wherein the quality level analysis unit includes a communication line condition analysis unit configured to analyze conditions of a communication line of voices of the respective input channels.

8. The inter-multipoint voice conversation apparatus according to claim 7, wherein the communication line condition analysis unit includes a delay analysis unit configured to analyze characteristics of delay in packets of voices of the respective input channels.

9. The inter-multipoint voice conversation apparatus according to claim 7, wherein the communication line condition analysis unit includes a jitter analysis unit configured to analyze characteristics of jitter in packets of voices of the respective input channels.

10. The inter-multipoint voice conversation apparatus according to claim 7, wherein the communication line condition analysis unit includes a packet loss analysis unit configured to analyze characteristics of loss in packets of voices of the respective input channels.

11. The inter-multipoint voice conversation apparatus according to claim 7, wherein the communication line condition analysis unit includes an echo analysis unit configured to analyze characteristics of echo in voices of the respective input channels.

12. The inter-multipoint voice conversation apparatus according to claim 1, wherein the quality level analysis unit includes a mixed noise level analysis unit configured to analyze a mixed noise level of voices of the respective input channels.

13. The inter-multipoint voice conversation apparatus according to claim 1, wherein the quality level analysis unit includes a signal/mixed noise level ratio analysis unit configured to analyze signal/mixed noise level ratios of voices of the respective input channels.

14. An inter-multipoint voice conversation apparatus for conducting voice communications among a plurality of points, comprising:

a receiving unit configured to receive voices of one or more input channels;

a quality level analysis unit configured to specify quality levels of voices of respective input channels received by the receiving unit;

a channel allocation/mixing unit configured to allocate or mixing voices of respective input channels received by the receiving unit to or into voices of one or more output channels; and an output unit configured to output voices of the respective output channels, wherein the quality level analysis unit includes two or more of a coding method specification unit configured to specify a coding method of voices of the respective input channels, a communication line condition analysis unit configured to analyze conditions of a communication line of voices of the respective input channels, a mixed noise level analysis unit configured to analyze a mixed noise level of voices of the respective input channels, and a signal/mixed noise level ratio analysis unit configured to analyze signal/mixed noise level ratios of voices of the respective input channels.

* * * * *